(12) United States Patent
Lin

(10) Patent No.: US 7,164,713 B2
(45) Date of Patent: Jan. 16, 2007

(54) INTERPOLATING ROOT NYQUIST FILTER FOR VARIABLE RATE MODULATOR

(75) Inventor: Chia-Liang Lin, Union City, CA (US)

(73) Assignee: Realtek Semiconductor Corp., Hsinchu (TW)

( * ) Notice: Subject to any disclaimer, the term of this patent is extended or adjusted under 35 U.S.C. 154(b) by 678 days.

(21) Appl. No.: 10/328,531

(22) Filed: Dec. 24, 2002

(65) Prior Publication Data

US 2004/0120393 A1     Jun. 24, 2004

(51) Int. Cl.
*H04H 7/30*     (2006.01)

(52) U.S. Cl. ..................................... 375/232

(58) Field of Classification Search ................ 375/232, 375/260, 261, 285, 295–296, 298; 332/103; 708/313
See application file for complete search history.

(56) References Cited

U.S. PATENT DOCUMENTS

| 5,412,352 | A | * | 5/1995 | Graham | 332/103 |
| 5,764,113 | A | * | 6/1998 | Snell | 332/103 |
| 6,031,431 | A | * | 2/2000 | Vinekar | 332/103 |
| 6,539,064 | B1 | * | 3/2003 | Ellis et al. | 375/296 |
| 6,711,214 | B1 | * | 3/2004 | Hershberger | 375/285 |

\* cited by examiner

*Primary Examiner*—Khanh Tran
(74) *Attorney, Agent, or Firm*—Daniel J. Bedell; Smith-Hill and Bedell

(57) ABSTRACT

A variable rate modulator maps an input data sequence $D_{IN}$ into a quadrature modulated output data sequence $D_{OUT}$ and then converts the $D_{OUT}$ data sequence into an analog output signal $A_{OUT}$. The data rate at which elements of the $D_{IN}$ sequence are supplied as input to modulator 10 may vary, but the sample rate $f_{samp}$ at which elements of the $D_{OUT}$ sequence are produce remains constant. In producing the $D_{OUT}$ sequence, the modulator employs an interpolating root Nyquist filter having time-varying filter coefficients to provide both low pass filtration and interpolation.

13 Claims, 4 Drawing Sheets

INTERPOLATING ROOT NYQUIST FILTER FOR VARIABLE RATE MODULATOR

BACKGROUND OF THE INVENTION

1. Field of the Invention

The present invention relates in general to a variable rate modulator for generating a modulated output sequence at a fixed rate representing an input sequence received at a variable rate, and in particular to an interpolating root Nyquist filter for a variable rate modulator.

2. Description of Related Art

FIG. 1 illustrates in block diagram form a prior art a variable rate quadrature amplitude modulator 8 generally similar to modulator described in U.S. Pat. No. 6,421,396. Modulator 8 includes a baseband and symbol mapping block 10 for processing an incoming data sequence $D_{IN}$ arriving at a "data" rate $f_{data}$ to produce a pair of digital symbol sequences $x_a(n)$ and $x_b(n)$ at a "symbol" rate $f_{symb}$ where $$f_{symb} = f_{data}/N \quad [1]$$

Symbol sequences $x_a(n)$ and $x_b(n)$ collectively represent the data content of data sequence $D_{IN}$. A pair of root Nyquist filters 12A and 12B low pass filter the $x_a(n)$ and $x_b(n)$ sequences to produce sequences $y_a(n)$ and $y_b(n)$ at twice the symbol rate, $2f_{symb}$. A pair of interpolate by K filters 14 interpolate sequences $y_a(n)$ and $y_b(n)$ to generate sequences $z_a(n)$ and $z_b(n)$ at a "sample" rate $f_{samp}$ that is 2K times higher than the symbol rate $f_{symb}$ of sequences $y_a(n)$ and $y_b(n)$:

$$f_{samp} = 2K \cdot f_{symb} \quad [2]$$

A circuit block 16 quadrature modulates and sums sequences $z_a(n)$ and $z_b(n)$ to provide an output data sequence $D_{OUT}$ at the sample rate $f_{samp}$. A digital-to-analog converter 18 then converts sequence $D_{OUT}$ into an analog signal $A_{OUT}$ representing the data content of $D_{IN}$.

The remote device (not shown) that supplies the input data sequence $D_{IN}$ also provides a clock signal CLK1 at the frequency of data rate $f_{data}$ to clock data elements of the $D_{IN}$ sequence into block 10. A timing synchronizer 24 generates clock signal CLK2 at the frequency of the symbol rate $f_{symb}$ to tell block 10 when to produce elements of the $x_a(n)$ and $x_b(n)$ sequences and generates a CLK4 signal at $2 f_{symb}$ to clock root Nyquist filters 12A and 12B and interpolation filters 14. A clock generator 22 supplies a clock signal CLK3 at the frequency of sampling rate $f_{samp}$ to block 16 to control the rate at which it processes the $z_a(n)$ and $z_b(n)$ sequence to produce the $D_{OUT}$ sequence.

Timing synchronizer 24 also supplies an interpolation coefficient $\mu_k$ to interpolation filters 14 controlling how they interpolate between successive elements of the $y_a(n)$ and $y_b(n)$ sequences. to calculate each element of the $z_a(n)$ and $z_b(n)$ as follows:

$$z_a(n) = (1-\mu_k)y_a(n-1) + \mu_k y_a(n), \text{ and}$$

$$z_b(n) = (1-\mu_k)y_b(n-1) + \mu_k y_b(n).$$

Timing synchronizer 24 increments $\mu_k$ by an amount $1/K$ at the sampling rate $f_{samp}$ of the CLK3 signal, and resets $\mu_k$ to 0 on every Kth pulse of the CLK3 signal. Thus $\mu_k$ is the repetitive sequence $$\mu_k = \{0, 1/K, 2/K \ldots (K-1)/K, 0, 1/K, \ldots\}.$$

While the values of $y_a(n)$, $y_b(n)$, $y_a(n-1)$ and $y_b(n-1)$ change at the symbol rate frequency $2 \cdot f_{symb}$ of the CLK4 signal, timing synchronizer 24 changes the value of interpolation coefficient $\mu_k$ at the sample rate $f_{samp}$ of clock signal CLK3 so that elements of $z_a(n)$ and $z_b(n)$ appear at the input of block 16 at sampling rate $f_{samp}$.

Modulator 8 is used in applications in which the data rate $f_{data}$ at which elements of input sequence $D_{IN}$ are supplied to block 10 may vary but the sampling rate $f_{samp}$ at which elements of the $D_{OUT}$ sequences are supplied to DAC 18 are to be held constant and independent of data rate $f_{data}$. From equations [1] and [2] above it may be seen that $$f_{samp} = (2K/N) f_{data} \quad [3]$$

$$f_{samp} = 2K \cdot f_{symb} \quad [4]$$

The value of N is constant ratio between the symbol rate $f_{symb}$ clock signal CLK2 and the rate $f_{data}$ of clock signal CLK1

$$N = f_{data}/f_{symb} \quad [5]$$

From equation [4] we see that the value of 2K is the rate ratio between $f_{symb}$ and $f_{samp}$. Since root Nyquist filters 12A and 12B produce sequences $y_a(n)$ and $y_b(n)$ at frequency $2f_{symb}$, timing synchronizer 24 adjusts the $\mu_k$ sequence supplied as input to interpolation filters 14 so that the filters provide the correct rate ratio K between it's input and output sequences.

FIG. 2 illustrates an example interpolation filter 14 of FIG. 1 for producing the $z_a(n)$ sequence in response to the $y_a(n)$ sequence including a register 26 clocked by the CLK2 signal for storing a current $y_a(n)$ value as a next $y_a(n-1)$ value, a pair of summers 27 and 28 and a multiplier 30 for processing the $y_a(n)$, $y_a(n-1)$ and $\mu_k$ sequences to produce the $z_a(n)$ sequence. A multiplier 30 capable of multiplying elements of the sequence:

$$\mu_k = \{0, 1/K, 2/K \ldots (K-1)/K, 0, 1/K, \ldots\}$$

is relatively simple and inexpensive to manufacture when K is restricted to values that are integer powers of 2, such that $K=2^P$, where P is an integer. But when K is allowed to be any integer K>1, multiplier 30 becomes more complex and expensive, and when K is allowed to be any number K>1, including fractional numbers, then multiplier 30 becomes very expensive. Since $$f_{data} = (N/2K) f_{samp}$$

and since N and $f_{samp}$ are fixed, then when we restrict the value of K to integers or powers of two, we also restrict the $f_{data}$ of the input data sequence $D_{IN}$ to a limited set of allowable values. Thus a variable modulator designer seeking to employ the modulator architecture of FIG. 1 is faced with the choosing between a low cost option wherein $f_{data}$ is limited to values for which $K=2^P$, a medium cost option wherein $f_{data}$ is restricted to value for which K is a positive integer, and a high cost option in which K may be any real number, K>=1.

Another drawback to the variable rate modulator architecture of FIG. 1 is that it requires timing synchronizer 24 to generate an additional clock signal CLK2 that is phase locked to clock signal CLK1. Phase locking circuitry is expensive and subjects the CLK2 signal to jitter.

What is needed is a lower cost architecture for a variable rate quadrature amplitude modulator that allows K to be any real number K>=1 and which avoids the need for phase locking circuits.

BRIEF SUMMARY OF THE INVENTION

A variable rate quadrature amplitude modulator maps an input data sequence $D_{IN}$ into a quadrature modulated output data sequence $D_{OUT}$ and converts the $D_{OUT}$ data sequence into an analog output signal $A_{OUT}$. The data rate $f_{data}$ at which elements of the $D_{IN}$ sequence are supplied as input to modulator 10 may vary, but the sample rate $f_{samp}$ at which elements of the $D_{OUT}$ sequence are produced remains constant.

In producing the $D_{OUT}$ sequence, the modulator includes a conventional baseband processing and symbol mapping block for mapping input data sequence into a pair of first data sequences and for producing elements of the first data sequence at an average symbol rate $f_{symb}=(1/N)f_{data}$, wherein N is a constant integer.

A pair of finite impulse response (FIR) filters, each acting as both a root Nyquist filter and an interpolation filter, low pass filter and interpolate the first sequences to produce second sequences at a rate that is $(M/N) \cdot f_{data}$. A pair of interpolate by $2^P$ filters then interpolate the second sequences to produce third sequences at sample rate $f_{samp} = (M/N) \cdot 2^P \cdot f_{data}$.

A timing synchronizer supplies sequences of filter coefficients to the FIR filter way that cause the FIR filter to act both as a root Nyquist filter and as an interpolate by M filter. The timing synchronizer chooses the FIR filter coefficient values to control the interpolation factor M of the FIR filters and also chooses the interpolation factor $2^P$ of the interpolation filters so that $f_{samp}$ is a constant that is unaffected by the value of $f_{data}$.

The claims appended to this specification particularly point out and distinctly claim the subject matter of the invention. However those skilled in the art will best understand both the organization and method of operation of what the applicant(s) consider to be the best mode(s) of practicing the invention, together with further advantages and objects of the invention, by reading the remaining portions of the specification in view of the accompanying drawing(s) wherein like reference characters refer to like elements.

DETAILED DESCRIPTION OF THE INVENTION

Figure 3:
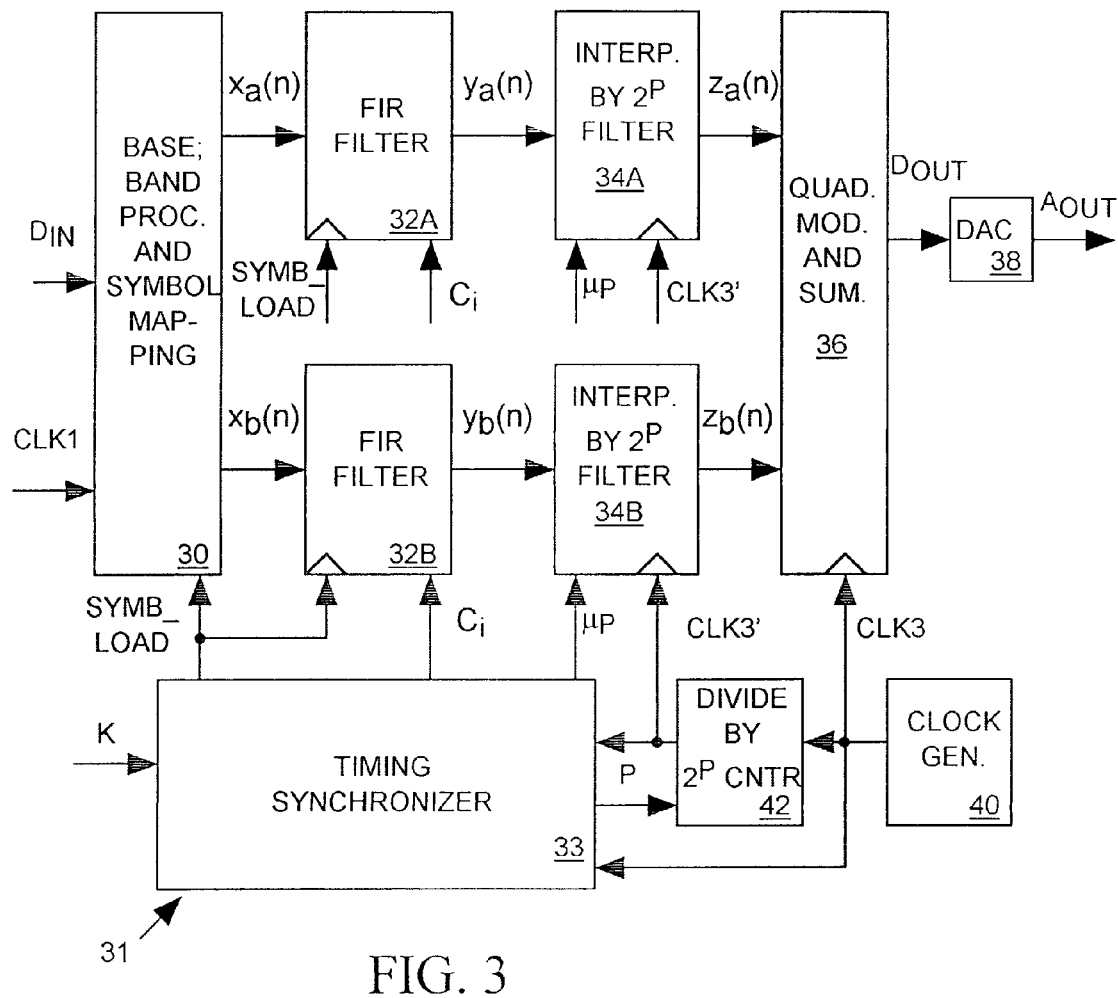
FIG. 3 illustrates a variable rate quadrature amplitude modulator in accordance with the invention in block diagram form.

FIG. 3 illustrates the example variable rate modulator 31 considered to be a best mode of practicing the invention, though other modes of practicing the invention are possible. Modulator 31 maps an input data sequence $D_{IN}$ into a quadrature modulated output data sequence $D_{OUT}$, and then converts the $D_{OUT}$ data sequence into an analog signal $A_{OUT}$. Modulator 31 is suitable for applications where the "sample rate" $f_{samp}$ at which elements of the $D_{OUT}$ sequence are supplied to DAC 38 is a constant but the "data rate" at which elements of the $D_{IN}$ sequence are supplied as input to block 30 may vary. The relationship between $f_{data}$ and $f_{samp}$ is $$f_{data}=(N/K)f_{samp}$$

where N and $f_{samp}$ are constants and K and $f_{data}$ are variables.

Modulator 31 includes a conventional baseband and symbol mapping block 30 for receiving each element of incoming data sequence $D_{IN}$ in response to an edge of an input clock signal CLK1 of data rate $f_{data}$ and for mapping the $D_{IN}$ sequence into a pair of symbol sequences $x_a(n)$ and $x_b(n)$ collectively represent the data content of data sequence $D_{IN}$. Block 30 produces one element of each the $x_a(n)$ and $x_b(n)$ sequences for every N elements of the $D_{IN}$ sequence. Edges of a "symbol load" signal (SYMB_LOAD) generated by a timing synchronizer circuit 33 tell block 30 when to produce each pair of $x_a(n)$ and $x_b(n)$ sequence element. The SYMB_LOAD signal is not necessarily periodic but its average frequency $f_{sla}$ is related to $f_{data}$ and $f_{samp}$ by $$f_{sla}=(1/N)f_{data} \qquad [6]$$

$$f_{sla}=(1/K)f_{samp}=(1/M*2^P)f_{samp} \qquad [7]$$

where
  N is a positive integer constant,
  P is an integer variable. P>=0,
  M is a real number variable, 2=<M<256, and
  $K=M \cdot 2^P$.

A pair of finite impulse response (FIR) filters 32A and 32B in accordance with the invention low pass (root Nyquist) filter and interpolate the $x_a(n)$ and $x_b(n)$ sequences to produce sequences $y_a(n)$ and $y_b(n)$ at a rate $M \cdot f_{samp}$. A pair of interpolate by $2^P$ filters 34A and 34B interpolate the $y_a(n)$ and $y_b(n)$ sequences to produce sequences $z_a(n)$ and $z_b(n)$ at sampling rate $f_{samp}$. A conventional circuit block 36 then quadrature modulates and sums the $z_a(n)$ and $z_b(n)$ sequences to produce elements of the $D_{OUT}$ sequence at the desired sampling rate $f_{samp}$. A digital-to-analog converter (DAC) then converts the $D_{OUT}$ sequence into the analog output signal $A_{OUT}$.

A clock signal generator 40 supplies a stable clock signal CLK3 of fixed sampling rate $f_{samp}$ as input to quadrature modulation block 36 to control the fixed rate at which it produces elements of the $D_{OUT}$ sequence. A divide-by-$2^P$ counter 44 frequency divides clock signal CLK3 to produce a clock signal CLK3' of frequency $f_{samp}/2^P$ for clocking interpolation filters 34A and 34B. The CLK3' signal also provides an input to timing synchronizer 33. Timing synchronizer supplies the appropriate value of P to counter 42.

Figure 4:
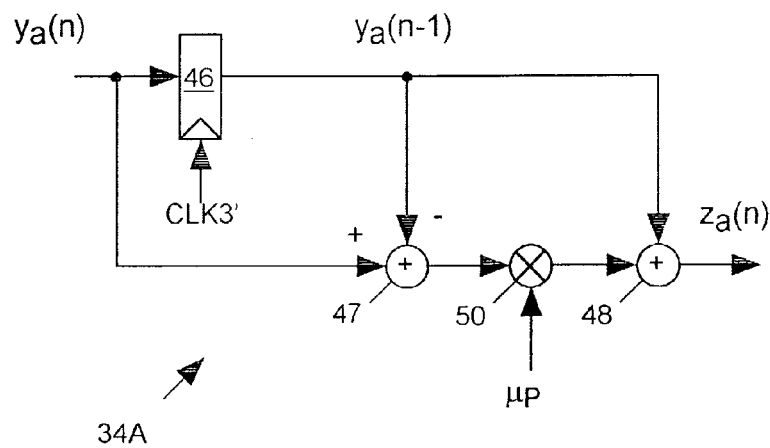
FIG. 4 illustrates the interpolate by K filter of FIG. 3 in more detailed block diagram form.

FIG. 4 illustrates a suitable implementation of interpolation filter 34A of FIG. 3; filter 34B is similar. Filter 34A includes a register 46 clocked by the CLK3' signal for storing the $y_a(n)$ sequence element preceding the current $y_a(n)$ sequence element as element $y_a(n-1)$. A pair of summers 47 and 48 and a multiplier 58 process $y_a(n)$, $y_a(n-1)$ and $\mu_k$ sequence elements to produce $z_a(n)$ sequence elements such that $$z_a(n)=[1-\mu_P]y_a(n-1)+\mu_P(n)y_a(n).$$

Each element $z_a(n)$ is therefore a weighted sum of $y_a(n)$ and $y_a(n-1)$ with weighting factors controlled by a coefficient sequence $\mu_P$. Although $y_a(n)$ and $y_a(n-1)$ change at the average rate $f_{samp}/2^P=f_{sla}$, timing synchronizer 33 generates the coefficient sequence $\mu_P$ at the rate $f_{samp}$ controlled by the CLK3 signal. Thus filter 34A produces $z_a(n)$ sequence elements at the sampling rate $f_{samp}$.

Timing synchronizer 33 generates an element of the $\mu_P(n)$ sequence in response to each edge of the CLK3' signal, such that $\mu_P$ is the repetitive sequence:

$$\mu_P = \{0, 1/2^P, 2/2^P \ldots (2^P-1)/2^P, 0, 1/2^P, \ldots\}$$

Figure 5:
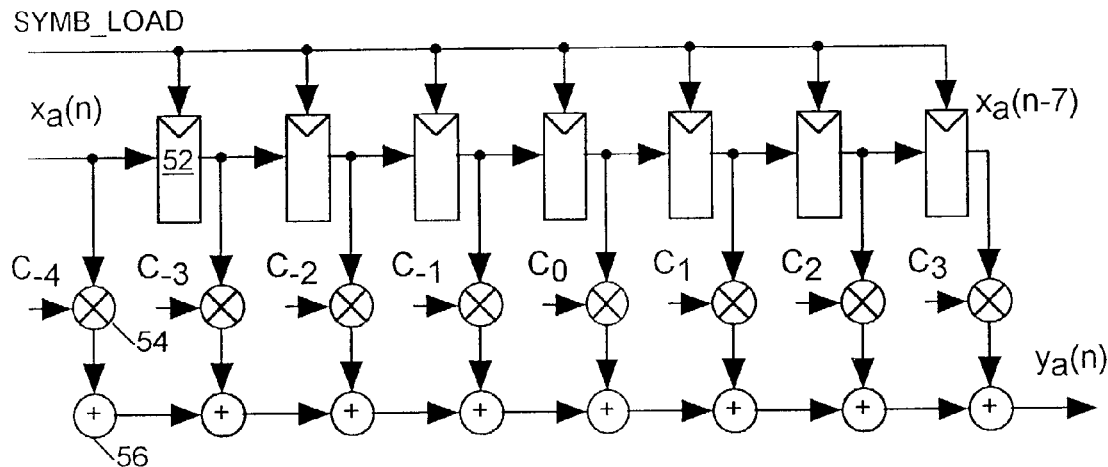
FIG. 5 illustrates the interpolating root Nyquist filter of FIG. 3 in more detailed block diagram form.

FIG. 5 illustrates FIR 32A of FIG. 3 in more detailed block diagram form; FIR filter 32B is similar. FIR filter 32A includes a set of seven registers 52 clocked by the SYMB_LOAD signal storing, for example, the seven most recent elements $x_a(n-1)$ through $x_a(n-7)$ of the $x_a(n)$ sequence. A set of eight multipliers 54 and eight summers 56 multiply $x_a(n)$ through $x_a(n-7)$ by a set of filter coefficients $C_{-4}(n)$ through $C_3(n)$, respectively and sum the results to produce the $y_a(n)$ sequence. Timing synchronizer 33 not only selects values of filter coefficients $C_{-4}(n)$ through $C_3(n)$ so that FIR filter 32A acts as a low pass, root Nyquist filter, it also continually adjusts the filter coefficients in response to the CLK3' signal to cause FIR filter 32A to also act as an interpolate by M filter. Thus even though the SYMB_LOAD signal loads $x_a(n)$ sequence elements into registers 52 at an average rate $f_{sla}$ that is $1/M^{th}$ the rate of the CLK3' signal, FIR filter 32A produces elements of the $y_a(n)$ output of FIR filter 32A at the rate $f_{samp}/2^P$ of the CLK3' signal.

Figure 6:
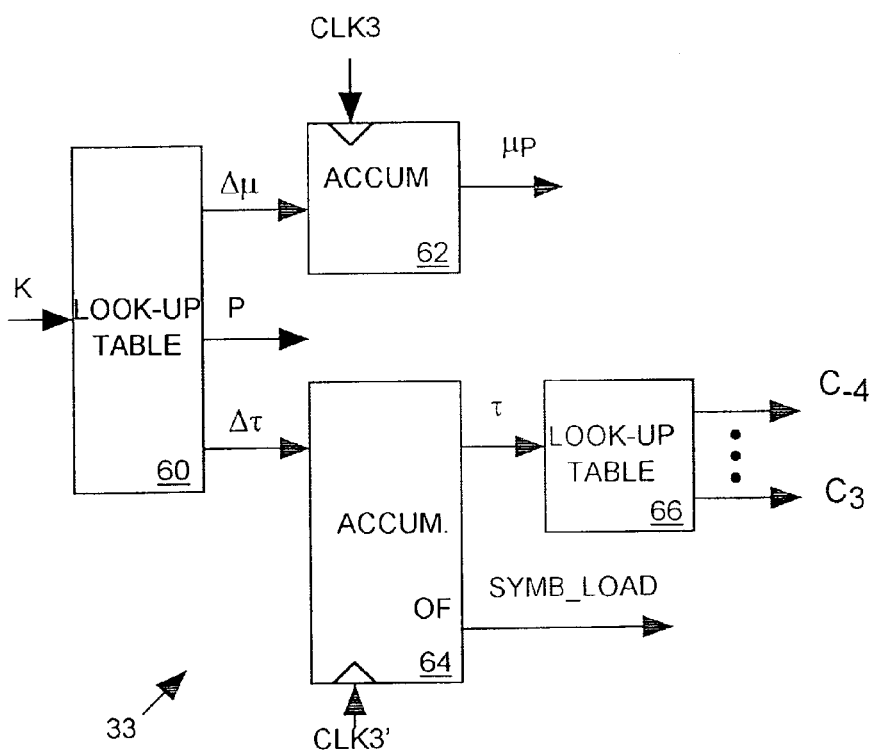
FIG. 6 illustrates the timing synchronizer of FIG. 3 in more detailed block diagram form.

FIG. 6 illustrates timing synchronizer 33 of FIG. 3 in more detailed block diagram form. Timing synchronizer 33 includes a look-up table 60 (suitably a read only memory) producing three output data values in response to each possible value of K. A first output of table 60 is the appropriate value of P for the given value of K, and that value of P controls divide-by-$2^P$ counter of FIG. 3 to control the frequency relationship between CLK3 and CLK3'.

A second output ($\Delta\mu$) of table 60 has value $1/2^P$. An accumulator 62, clocked by the CLK3 signal, accumulates the $\Delta\mu$ to produce the $\mu_P$ coefficient sequence supplied as input to interpolation filters 34A and 34B of FIG. 3. Accumulator 62 overflows when $\mu_P$ reaches its maximum value of 1.

A third output $\Delta\tau$ of table 60 has value H/M where $M=K/2^P$ and H is a constant, for example, 256. Another accumulator 64, clocked by the CLK3' signal, accumulates $\Delta\tau$ to produce an output sequence $\tau$, elements of which may range in value between 0 and 255, assuming H=256. Accumulator 64 overflows after reaching 255, and each time it overflows, it supplies a SYMB_LOAD signal pulse to baseband processing and symbol mapping block 30 and FIR filters 32A and 32B of FIG. 3. An 256-entry lookup table 66 addressed by the upper 8 bits of $\tau$, stores at each address a complete set of values for coefficients $C_{-4}(n)$ through $C_3(n)$ for FIR filters 32A and 32B of FIG. 3. Thus each time $\tau$ changes its value in response to an edge of the CLK3' signal, table 66 alters the values of coefficients $C_i$ supplied to FIR filters 32A and 32B of FIG. 3.

Each $i^{th}$ filter coefficient $C_i$ is suitably a function of $\tau$ as follows:

$$C_i(\tau) = rr\cos(i+\tau/256)$$

where the "root raise cosine response function" $rr\cos(x)$ of any argument x is $$rr\cos(x) = \frac{\sin\pi x(1-\alpha) + (1-\alpha)x\cos\pi x(1+\alpha)}{\pi x[1-(1-\alpha)^2 x^2]}$$

The constant $\alpha$ is a roll-off factor selected to give FIR filters 32A and 32B desired low pass filtering characteristics.

Figure 7:
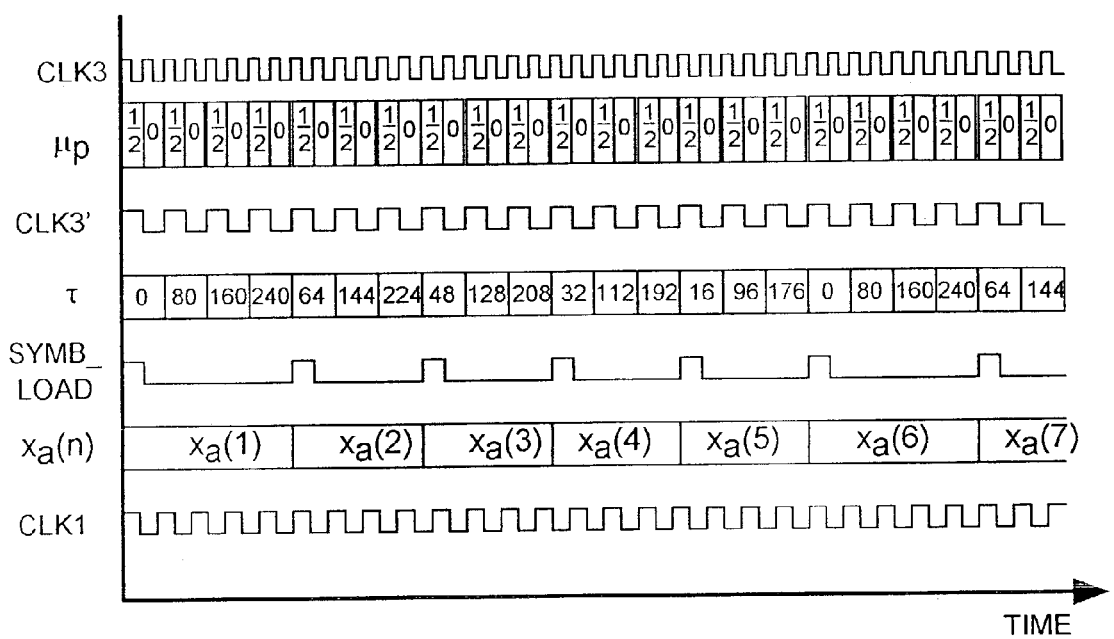
FIG. 7 is a timing diagram illustrating timing relationships between signals and data sequences depicted in FIGS. 3 and 6.

FIG. 7 is a timing diagram illustrating timing relationships between various signals within timing synchronizer 33 of FIG. 3 in an example wherein N=4 and K=6.4. For this value of K, appropriate values of P and M are 1 and 3.2, respectively, so that $K=M\cdot 2^P=6.4$. Lookup table 60 of FIG. 6 therefore responds to K=6.4 by generating output values P=1, $\Delta\mu=1/2^P=0.5$, and $\Delta\tau=256/M=80$.

With P=1, counter 42 of FIG. 3 frequency divides the CLK3 signal frequency by $2^P=2$ to produce a CLK3' signal having a frequency one half of the sampling frequency $f_{samp}$ of CLOCK2. As accumulator 62 accumulates $\Delta\mu=0.5$, its output $\mu_P$ alternates between 0 and 0.5 on successive edges of the CLK3 signal. As accumulator 64 accumulates $\Delta\tau=80$ to produce the $\tau$ sequence, it produces a SYMB_LOAD pulse whenever $\tau$ overflows upon passing 255 so that the average frequency $f_{sla}$ of the SYMB_LOAD signal is M=3.2 times smaller than the frequency of the CLK3' signal. The frequency $f_{data}$ of the CLK1 signal is N=4 times the average frequency $f_{sla}$ of the SYMB_LOAD signal.

Figure 1:
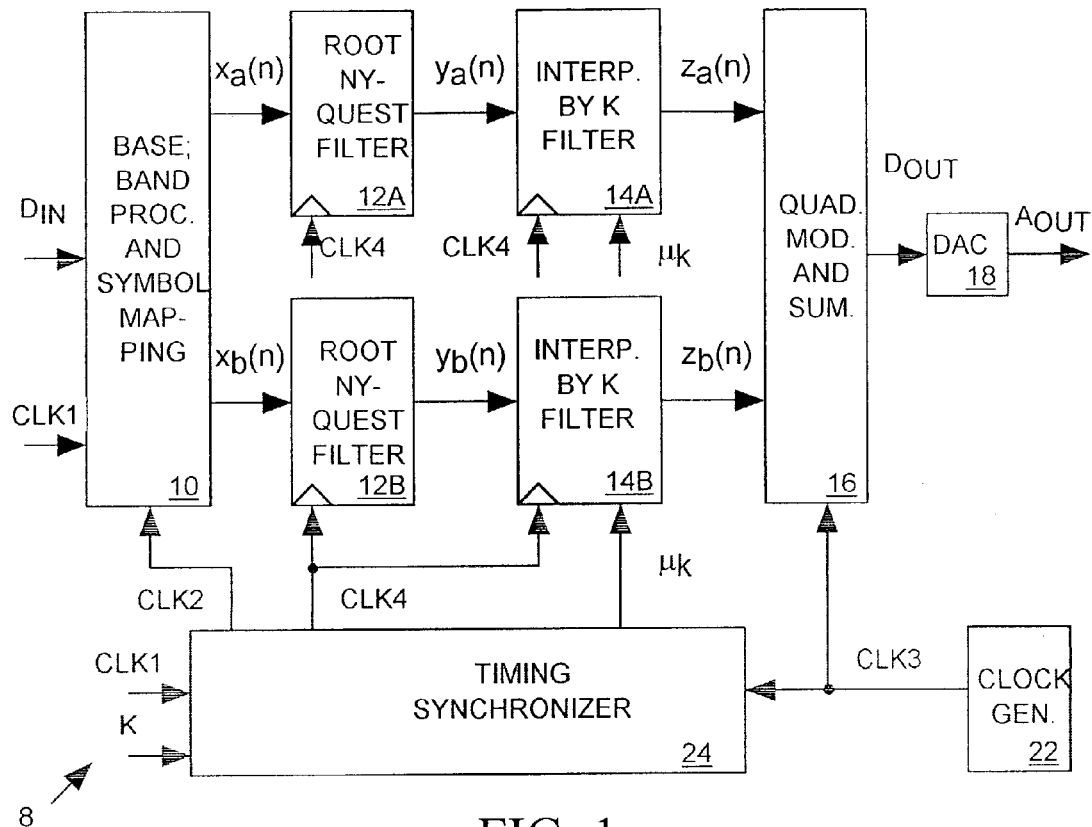
FIG. 1 illustrates a prior art variable rate quadrature amplitude modulator in block diagram form.
Figure 2:
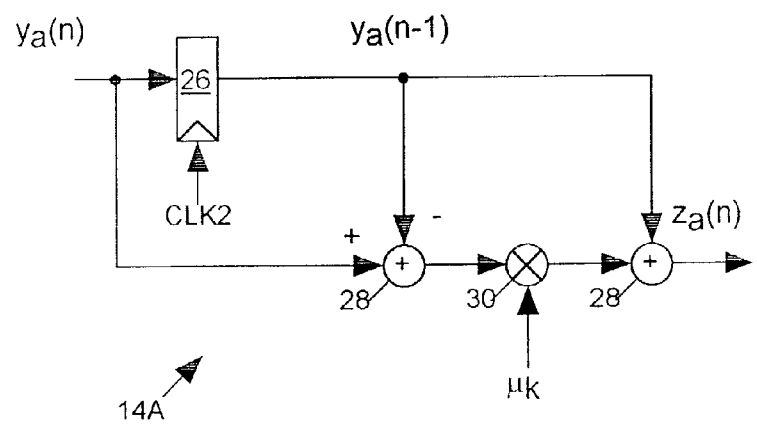
FIG. 2 illustrates the interpolate by K filter of FIG. 1 in more detailed block diagram form.

Thus to obtain the necessary interpolation factor $K=M\cdot 2^P$, where K can be a real number greater than one, including integers and fractional numbers, modulator 31 employs filters 34A and 34B to interpolate by $2^P$ and employs interpolating root Nyquist filters 12A and 12B to provide the necessary additional interpolation M. The architecture of FIR filter 32A of FIG. 5 is conventional and could implement the root Nyquist filters 12A and 12B of prior art modulator 8 of FIG. 1. However while root Nyquist filters 12A and 12B of prior art modulator 8 have fixed filter coefficients, FIR filters 34A and 34B of modulator 31 have time-varying filter coefficients selected to enable them to act both as low pass, root Nyquist filters and as interpolate by M filters. By using the same FIR filter to acts both as a root Nyquist filter and as an interpolate by M filter, modulator 31 of the present invention is able to use the relatively inexpensive interpolate by $2^P$ filters 34A and 34 instead of the more expensive interpolate by K filters 14A and 14B required by modulator 8.

As discussed above, timing synchronizer 24 of prior art modulator generates a clock signal CLK2 of the sample frequency $f_{samp}$ that is phase locked to data clock CLK1 to control the rate at which symbols are produced and uses the CLK2 signal to clock the sequences of symbols out of baseband processing and symbol mapping block 10, through root Nyquist filters 12A and 12B, and into interpolation filters 14A and 14B. The phase locking circuitry within timing synchronizer 24 needed to generate the CLK2 signal is expensive. Timing synchronizer 33 of modulator 31 generate a SYMB_LOAD signal to carry out the function of the CLK2 signal, but the SYMB_LOAD signal need not necessarily be a periodic clock signal, and timing synchronizer 24 need employ only an inexpensive accumulator rather than an expensive phase lock circuit to produce the SYMB_LOAD signal.

Thus has been shown and described and exemplary embodiment of the best mode of practicing the invention, and elements or steps of the depicted best mode exemplify the elements or steps of the invention as recited in the appended claims. However the appended claims are intended to apply to any mode of practicing the invention comprising the combination of elements or steps as described in any one of the claims, including elements or steps that are functional equivalents of the example elements or steps of the exemplary embodiment(s) of the invention depicted in the specification and drawings. For example, while interpolating root Nyquist filter 34A is depicted in FIG. 5 as including eight multiplier stages an eight coefficient inputs, filters 34A and 34B may have other numbers of stages and coefficients. Also those of skill in the art will appreciate that the architecture of interpolation filter 34A depicted in FIG. 4 and the architecture of timing synchronizer 33 depicted in FIG. 6 are exemplary, and that architectures may be employed to carry out their digital signal processing functions.

The invention claimed is:

1. An apparatus for processing data comprising:
a finite impulse response (FIR) filter receiving a first sequence of first data elements at a first average rate and generating a second sequence of second data elements at a periodic second rate that is higher than the first average rate, wherein a value of each second data element is a sum of products of a value of each $i^{th}$ one of a corresponding set of successive ones of the first data elements and a corresponding $i^{th}$ filter coefficient $C_i$ of a set of filter coefficients; and
a timing synchronizer for generating and providing each $i^{th}$ filter coefficient $C_i$ as input to the FIR filter, wherein the timing synchronizer periodically adjusts a value of each $i^{th}$ filter coefficient $C_i$ at the second rate such that the FIR filter both low pass filters and interpolates the first sequence to produce the second sequence wherein a value of each $i^{th}$ filter coefficient $C_i$ is a function $C_i(\tau)$ of a variable $\tau$ that periodically changes in value at the second rate, $$C_i(\tau) = rr\cos(i+\tau/H)$$

wherein H is an integer greater than 0, and for each argument x, $$rr\cos(x) = \frac{\sin\pi x(1-\alpha) + (1-\alpha)x\cos\pi x(1+\alpha)}{\pi x[1-(1-\alpha)^2 x^2]}$$

wherein $\alpha$ is a real number constant.

2. The apparatus in accordance with claim 1
wherein the timing synchronizer generates $\tau$ by accumulating a number $\Delta\tau$ at the second rate such that an accumulated value of $\tau$ overflows a maximum value at the average first average rate.
wherein the FIR filter receives each first data element in response to a separate edge of load signal, and
wherein the timing synchronizer generates an edge of the load signal each time $\tau$ overflows.

3. The apparatus in accordance with claim 2 further comprising:
an interpolation filter for receiving the second sequence at the second rate and for interpolating the second sequence to produce a third sequence of data elements at a periodic third rate that is $2^P$ times higher than the second rate, where interpolation factor P is an adjustable integer at least as large as zero.

4. The apparatus in accordance with claim 3 wherein the timing synchronizer adjusts interpolation factor P and $\Delta\tau$ so that the third rate is constant and independent of the data rate.

5. A variable rate modulator comprising:
a baseband and symbol mapping block for receiving an input sequence of data elements at a periodic data rate and processing the input sequence to produce a first sequence of first data elements at a first average rate that is $1/N^{th}$ of the data rate and to produce a second sequence or second data elements at a first average rate, wherein N is a positive integer, and wherein the first and second sequences jointly represent the input sequence;
a first finite impulse response (FIR) filter receiving the first data elements at the first average rate and generating a third sequence of third data elements at a periodic second rate that is higher than the first average rate, wherein a value of each third data element is a sum of products of a value of each $i^{th}$ one of a corresponding set of successive first data elements and a corresponding $i^{th}$ filter coefficient $C_i$ of a set of filter coefficients;
a second finite impulse response (FIR) filter receiving the second data elements at the first average rate and periodically generating a fourth sequence of fourth data elements at the second rate, wherein a value of each fourth data element is a sum of products of a value of each $i^{th}$ one of a corresponding set of successive second data elements and a corresponding $i^{th}$ filter coefficients $C_i$ of a set of filter coefficients; and
a timing synchronizer generating and providing each $i^{th}$ filter coefficient $C_i$ as input to the first and second FIR filters, wherein the processing means periodically adjusts a value of each $i^{th}$ filter coefficient at the second rate such that the first FIR filter both low pass filters and interpolates the first sequence to produce the third sequence, and such that the second FIR filter low pass filters and interpolates the second sequence to produce the fourth sequence wherein a value of each $i^{th}$ filter coefficient $C_i$ is a function $C_i(\tau)$ of a variable $\tau$ that periodically changes in value at the second rate, $$C_i(\tau) = rr\cos(i+\tau/H)$$

wherein H is an integer greater than 0, and for each argument x, $$rr\cos(x) = \frac{\sin\pi x(1-\alpha) + (1-\alpha)x\cos\pi x(1+\alpha)}{\pi x[1-(1-\alpha)^2 x^2]}$$

wherein $\alpha$ is a real number constant.

6. The Variable rate modulator in accordance with claim 5 wherein the timing synchronizer generates $\tau$ by accumulating a number $\Delta\tau$ at the second rate such that an accumulated value of $\tau$ overflows a maximum value at the average first average rate.
wherein the first and second FIR filters receive first and second data elements, respectively, in response to a separate edge of load signal, and
wherein the timing synchronizer generates an edge of the load signal each time $\tau$ overflows.

7. The Variable rate modulator in accordance with claim 6 further comprising:
a first interpolation filter for receiving the third sequence at the second rate and for interpolating the third sequence to produce data element of a fifth sequence at a periodic third rate that is 2 times higher than the second rate, where interpolation factor P is an adjustable integer at least as large as zero; and
a second interpolation filter for receiving the fourth sequence at the second rate and for interpolating the fourth sequence to produce data elements of a sixth sequence the third rate.

8. The Variable rate modulator in accordance with claim 7 wherein the timing synchronizer adjusts interpolation actor P and $\Delta\tau$ so that the third rate is constant and independent of the data rate.

9. The Variable rate modulator in accordance with claim 7 further comprising:
means for quadrature modulating and summing the fifth and sixth sequences to produce data elements or a seventh sequence at the third rate.

10. The Variable rate modulator in accordance with claim 9 further comprising an analog to digital converter for generating an analog signal in response to the seventh sequence.

11. A variable rate modulator comprising:
a baseband and symbol mapping block for receiving an input sequence of data elements at a periodic data rate and processing the input sequence to produce a first sequence of first data elements at a first average rate that is $1/N^{th}$ of the data rate and to produce a second sequence of second data elements at a first average rate, wherein N is a positive integer, and wherein the first and second sequences jointly represent the input sequence;
a first finite impulse response (FIR) filter receiving the first data elements at the first average rate and generating a third sequence of third data elements at a periodic second rate that is higher than the first average rate, wherein value of each third data element is a sum of products of a value of each $i^{th}$ one of a corresponding set of successive first data elements and a corresponding $i^{th}$ filter coefficient $C_i$ of a set of filter coefficients;
a second finite impulse response (FIR) filter receiving the second data elements at the first average rate and periodically generating a fourth sequence of fourth data elements at the second rate, wherein a value of each fourth data element is a sum of products of a value of each $i^{th}$ one of a corresponding set of successive second data elements and corresponding $i^{th}$ filter coefficient $C_i$ of a set of filter coefficients; and
a timing synchronizer generating and providing each $i^{th}$ filter coefficient $C_i$ as input to the first and second FIR filters, wherein the processing means periodically adjusts a value of each $i^{th}$ filter coefficient at the second rate such that the first FIR filter both low pass filters and interpolates the first sequence to produce the third sequence, and such that the second FIR filter low pass filters and interpolates the second sequence to produce the fourth sequence wherein the first and second FIR filters are interpolating root Nyquist filters,
wherein the second rate is M times higher than the first average rate, where M is a positive, real number,
wherein a value of each $i^{th}$ filter coefficient $C_i$ is a function $C_i(\tau)$ of a variable $\tau$ that periodically changes in value at the second rate, $$C_i(\tau) = rr\cos(i+\tau/H)$$

wherein H is an integer greater than 0, and for each argument x, $$rr\cos(x) = \frac{\sin\pi x(1-\alpha) + (1-\alpha)x\cos\pi x(1+\alpha)}{\pi x[1-(1-\alpha)^2 x^2]}$$

wherein $\alpha$ is a real number constant,
wherein the timing synchronizer generates $\tau$ by accumulating a number $\Delta\tau$ at the second rate such that an accumulated value of $\tau$ overflows a maximum value at the average first average rate,
wherein the first and second FIR filters receive first and second data elements, respectively, in response to a separate edge of load signal,
wherein the timing synchronizer generates an edge or the load signal each time $\tau$ overflows.

12. The Variable rate modulator in accordance with claim 11 further comprising:
a first interpolation filter receiving the third sequence at the second rate and interpolating the third sequence to produce a fifth sequence of data elements at a periodic third rate that 2 times higher than the second rate, where interpolation factor P is an adjustable integer at least as large as zero; and
a second interpolation filter for receiving the fourth sequence at the second rate and interpolating the fourth sequence to produce a sixth sequence of sixth data elements the third rate,
wherein the timing synchronizer adjusts interpolation factor P and $\Delta\tau$ so that the third rate is constant and independent of the data rate.

13. The variable rate modulator in accordance with claim 12 further comprising:
means for quadrature modulating and summing the fifth and sixth sequences to produce elements of a seventh sequence at the third rate; and
an analog-to-digital converter for generating an analog signal in response to the seventh sequence.

* * * * *

UNITED STATES PATENT AND TRADEMARK OFFICE
CERTIFICATE OF CORRECTION

PATENT NO. : 7,164,713 B2
APPLICATION NO. : 10/328531
DATED : January 16, 2007
INVENTOR(S) : Chia-Liang Lin It is certified that error appears in the above-identified patent and that said Letters Patent is hereby corrected as shown below:

Column 7

Line 35, the equation should be deleted and replaced with $$-- \quad rrcos(x) = \frac{\sin \pi x (1-\alpha) + (1-\alpha) x \cos \pi x (1+\alpha)}{\pi x [1 - (1-\alpha)^2 x^2]} \quad --$$

Column 8

Line 1, "sequence or second" should be deleted and replaced with --sequence of second--.

Line 19, "coefficients" should be deleted and replaced with --coefficient--.

Lines 35-40, the equation should be deleted and replaced with $$-- \quad rrcos(x) = \frac{\sin \pi x (1-\alpha) + (1-\alpha) x \cos \pi x (1+\alpha)}{\pi x [1 - (1-\alpha)^2 x^2]} \quad --$$

Line 42, "The Variable" should be deleted and replaced with --The variable--.

Line 52, "The Variable" should be deleted and replaced with --The variable--.

Line 64, "The Variable" should be deleted and replaced with --The variable--.

Line 65, "actor" should be deleted and replaced with --factor--.

Column 9

Line 1, "The Variable" should be deleted and replaced with --The variable--.

Line 4, "elements or" should be deleted and replaced with --elements of--.

Line 6, "The Variable" should be deleted and replaced with --The variable--.

Line 24, "wherein value" should be deleted and replaced --wherein a value--.

UNITED STATES PATENT AND TRADEMARK OFFICE
CERTIFICATE OF CORRECTION

PATENT NO. : 7,164,713 B2
APPLICATION NO. : 10/328531
DATED : January 16, 2007
INVENTOR(S) : Chia-Liang Lin It is certified that error appears in the above-identified patent and that said Letters Patent is hereby corrected as shown below:

Column 10

Line 1, "wherein α value" should be deleted and replaced with --wherein a value--.

Line 10, the equation should be deleted and replaced with $$rrcos(x) = \frac{\sin \pi x (1-\alpha) + (1-\alpha)x\cos \pi x (1+\alpha)}{\pi x [1-(1-\alpha)^2 x^2]}$$

Line 22, "edge or" should be deleted and replaced with --edge of--.

Line 24, "The Variable" should be deleted and replaced with --The variable--.

Line 29, "rate that 2 times" should be deleted and replaced with --rate that is 2 times--.

Signed and Sealed this

Twenty-seventh Day of March, 2007

JON W. DUDAS
*Director of the United States Patent and Trademark Office*